Dec. 9, 1924.  
T. ALLATT  
1,518,551  
TAG MACHINE  
Filed Jan. 18, 1923     12 Sheets-Sheet 1

Fig. 1.

INVENTOR  
T. Allatt  
BY  
Sigmund Herzog  
ATTORNEY

Dec. 9, 1924.

T. ALLATT 1,518,551

TAG MACHINE

Filed Jan. 18, 1923  12 Sheets-Sheet 5

Fig. 5.

INVENTOR
T. Allatt
BY
Lemmuel Herzog
ATTORNEY

Dec. 9, 1924.

T. ALLATT

TAG MACHINE

Filed Jan. 18, 1923

INVENTOR
T. Allatt
BY
Sigmund Herzog
ATTORNEY

Dec. 9, 1924.

T. ALLATT

TAG MACHINE

Filed Jan. 18, 1923

INVENTOR
T. Allatt
BY Sigmund Herzog
ATTORNEY

Dec. 9, 1924.

T. ALLATT

TAG MACHINE

Filed Jan. 18, 1923    12 Sheets-Sheet 11

INVENTOR
T. Allatt
BY
Sigmund Herzog
ATTORNEY

Dec. 9, 1924.

T. ALLATT

TAG MACHINE

Filed Jan. 18, 1923  12 Sheets—Sheet 12

1,518,551

INVENTOR
T. Allatt
BY
ATTORNEY

Patented Dec. 9, 1924.

1,518,551

UNITED STATES PATENT OFFICE.

THOMAS ALLATT, OF WESTFIELD, NEW JERSEY, ASSIGNOR, BY MESNE ASSIGNMENTS, TO MILLIE PATENT HOLDING CO. INC., OF NEW YORK, N. Y., A CORPORATION OF NEW YORK.

TAG MACHINE.

Application filed January 18, 1923. Serial No. 613,443.

*To all whom it may concern:*

Be it known that I, THOMAS ALLATT, a citizen of Great Britain, and resident of Westfield, in the county of Union and State of New Jersey, have invented certain new and useful Improvements in Tag Machines, of which the following is a specification.

The present invention relates to improvements in tag-machines, and has for its main object to provide an automatic mechanism for cutting out tags from appropriate strips and attaching thereto a string or like device, by means of which the said tag may be affixed to the article to be identified.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

In carrying out the invention a strip of paper or like material, containing a series of tag blanks arranged uniform distances apart, is fed to devices which punch the tags therefrom. A strip of metal, on the other hand, is carried to a mechanism which forms staples therefrom, the punching and staple forming devices being, preferably, in alignment. A string is fed past the punching and staple forming mechanisms, the string being fastened by a staple to a tag and then severed. With the elements mentioned co-operates an apparatus which carries away the tags and the strings fastened thereto from the mechanisms referred to and separates them into bunches, each containing a predetermined number of the articles so manufactured.

One of the many possible embodiments of the invention is illustrated in the accompanying drawings, in which:—

Figures 8, 12:
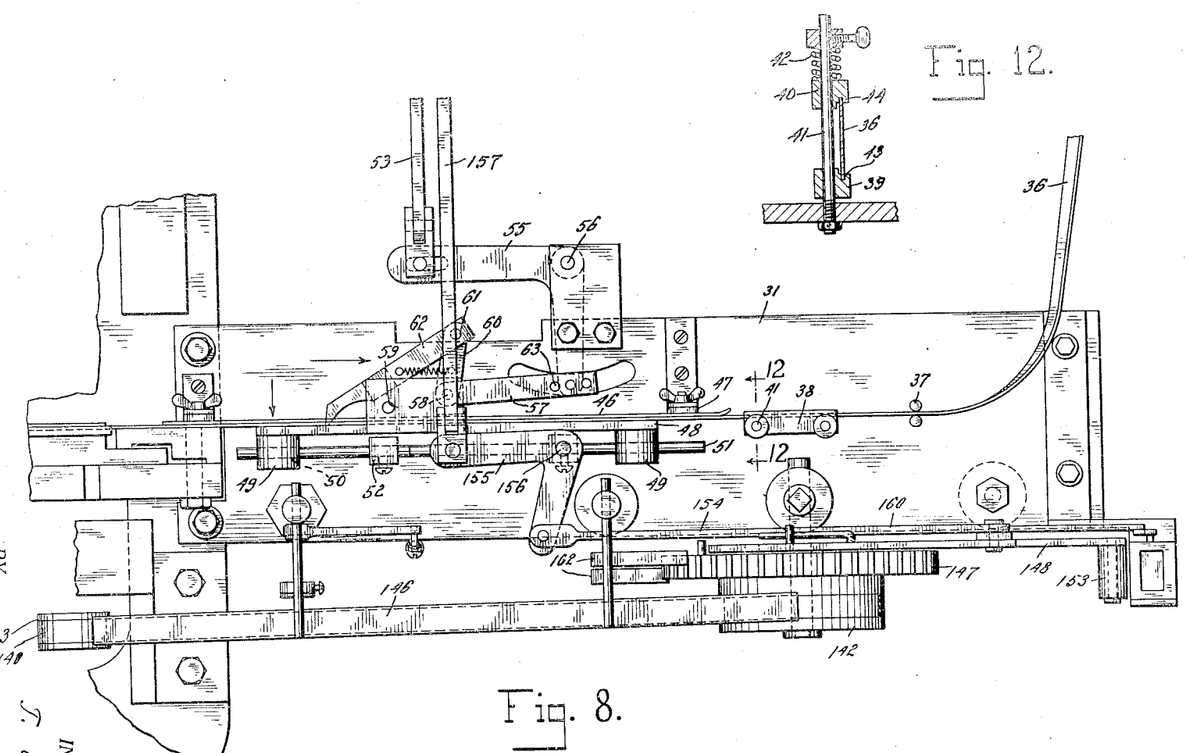
Fig. 8 is a top elevation, on a larger scale, of the sidewardly projecting portion of the machine.
Fig. 12 is a section taken on line 12—12 of Fig. 8.
Figures 9, 10, 11:
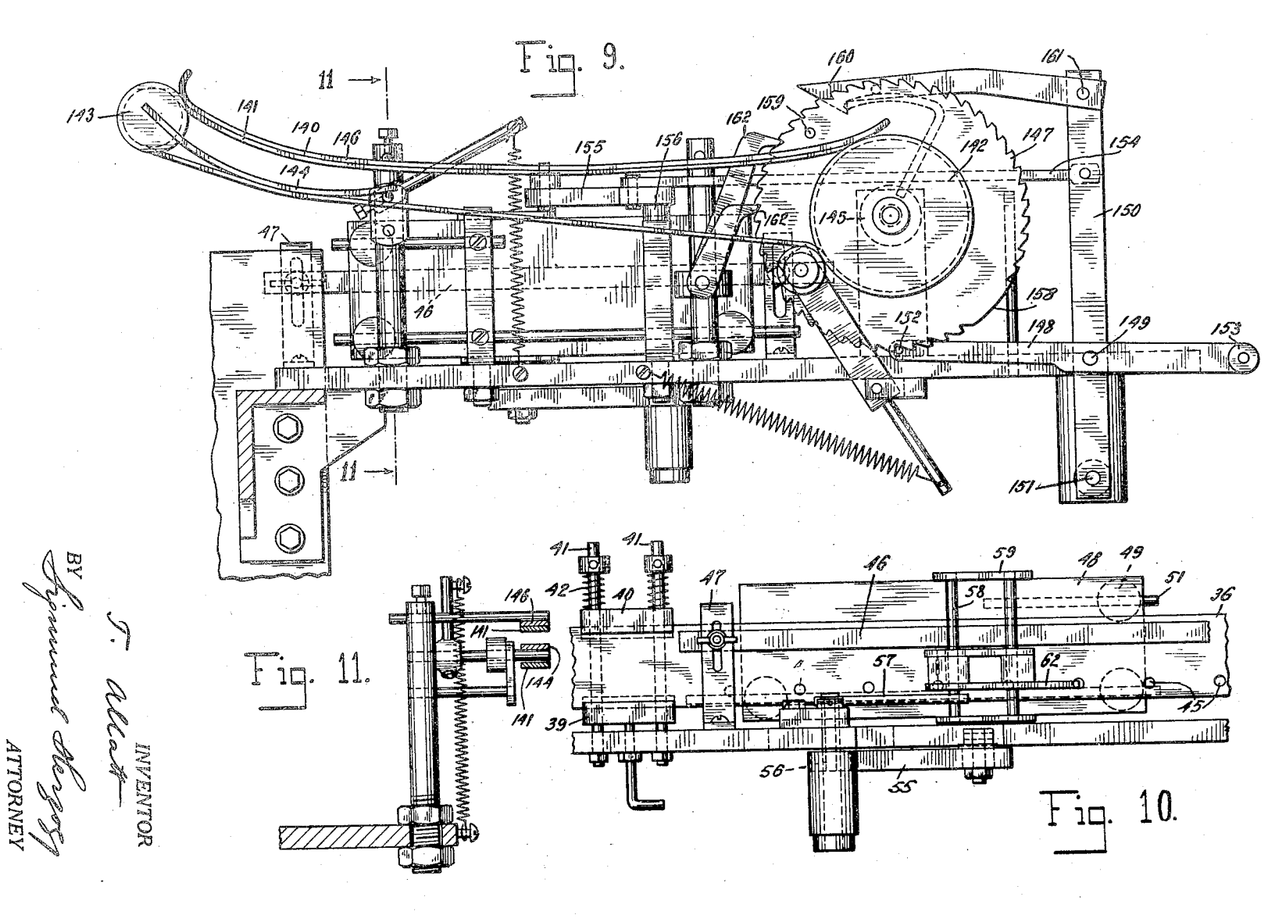
Fig. 9 is a front elevation of the detail shown in Fig. 8.
Fig. 10 is a rear elevation of a portion of the apparatus illustrated in Fig. 8, looking in the direction of the arrow shown in Fig. 8.
Fig. 11 is a section taken on line 11—11 of Fig. 9.

In the drawings, the numeral 30 indicates the main frame of the machine, including a horizontal table portion 31, mounted upon legs or standards 32. On the table portion of this frame are mounted bearings 33, in which is journaled the driving shaft 34 of the machine, said shaft being driven from any suitable source of power in any preferred way, it having keyed thereto, for instance, a gear 35 in mesh with a gear, not shown, that is driven from either a transmission or by a suitable motor. All moving elements of the machine are actuated by said driving shaft, as will hereinafter appear. The tags are formed from a narrow continuous strip 36 of cardboard or like material, it being led vertically between guide rollers 37 to a stationary guide 38, the latter including a lower bodily stationary block 39 (Fig. 12) and an upper block 40, that is slidable on spindles 41, the latter being fixed to the table portion of the frame. The block 40 is under the action of springs 42. In the blocks 39 and 40 are formed the guide grooves 43 and 44, respectively, engaging the lower and upper edges of the strip 36. On the strip are printed tags, the printed matter being not shown in the drawings. The strip is provided with equi-distantly disposed perforations 45 adjacent its lower edge, as clearly shown in Fig. 10 of the drawings, for co-operation with the strip feeding means. From the guide blocks 39 and 40 the strip 36 passes toward a stationary vertical supporting strip 46, carried by standards 47, the latter being mounted upon the table portion of the machine. The purpose of this strip is to prevent tilting of the strip, from which the tags are cut. With the strip 46 co-operates a plate member 48, which is disposed on that side of the strip 36 which is opposite to the one which is in contact with the supporting strip 46. The plate member 48 is provided with bosses 49, having horizontal bores 50, through which extend horizontal guide bars 51, the latter being carried by a support 52. The plate member 48 is reciprocably mounted on these guide bars, it being actuated from the driving shaft 34 by a rod 53, engaging a crank 54 on the said driving shaft and a bellcrank lever 55, that is fulcrumed at 56 to the table portion of the machine frame and connected by a link 57 with a pin 58, which is fixed to horizontal projections 59 on the plate member 48, (Fig. 10). To the pin 58 is fixed an arm 60, and to this arm is fulcrumed at 61 a spring engaged pawl 62, the latter being disposed on that side of the strip 36 which is opposite to the side which is in engagement with the plate member 48, the said pawl being adapted to engage the perforations 45 in the said strip. As the shaft 34 rotates, the plate member 48 and the feeding pawl connected therewith are moved back and forth, the pawl being on its idle stroke when moving in the direction of the arrow shown adjacent the same in Fig. 8 of the drawings and on its feeding stroke when moving in the opposite direction. When moving in the last-mentioned direction, the said pawl engages one of the perforations in the strip 36 and feeds the same to the punching dies, hereinafter to be described, a distance corresponding to the stroke of the plate member 48. The stroke of the said plate member may be varied according to the requirements, and for this purpose, for instance, the link 57 is provided with a series of holes 63, through anyone of which a pin carried by the bell-crank lever 55 may be passed.

The tag strip feeding mechanism causes the latter to move through a guide 64 (Fig. 4) on a stationary female punching die 65, which is detachably mounted upon the main frame of the machine and with which co-operates a punch 66, the latter being detachably mounted upon a sliding head 67, moving in guides 68 and adjustably connected with a yoke 69. With this yoke co-operates a cam 70 on the driving shaft 34, moving the punch 66 to and from the female punch 65. The punches 65 and 66 may be replaced by others, according to the design of the tags to be punched. The strip from which the tags are punched is printed prior to its entry of the machine on a printing press or other suitable mechanism.

Figure 13:
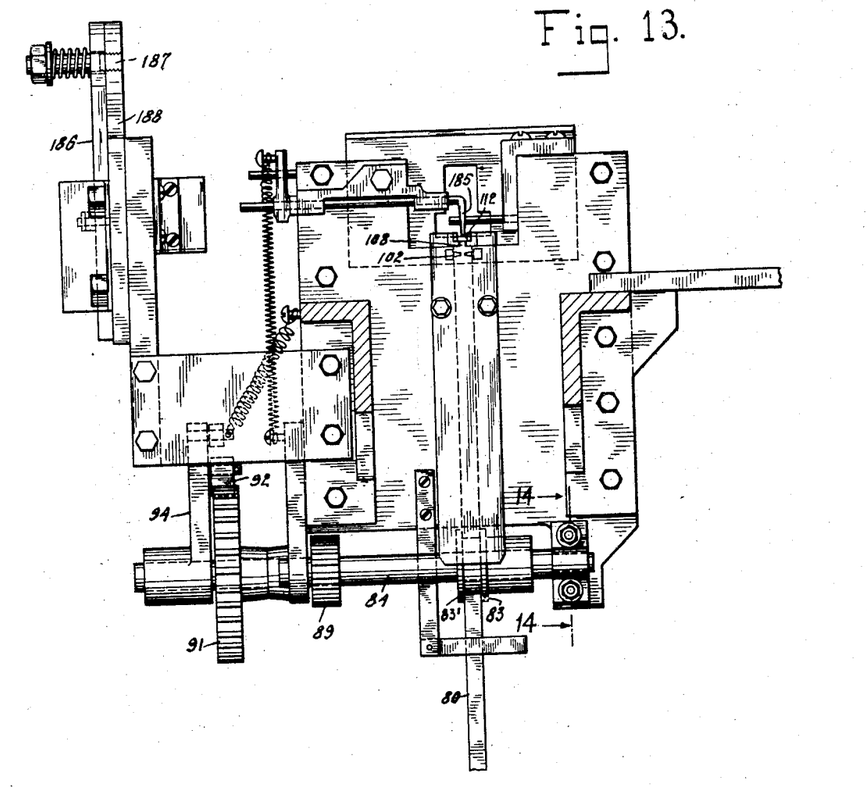
Fig. 13 is a section taken on line 13—13 of Fig. 7.
Figure 14:
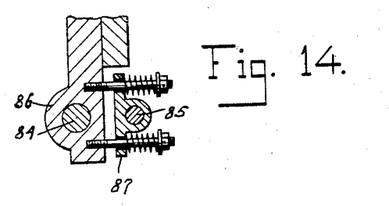
Fig. 14 is a section taken on line 14—14 of Fig. 13.
Figures 19, 20, 21, 22, 23, 24, 25:
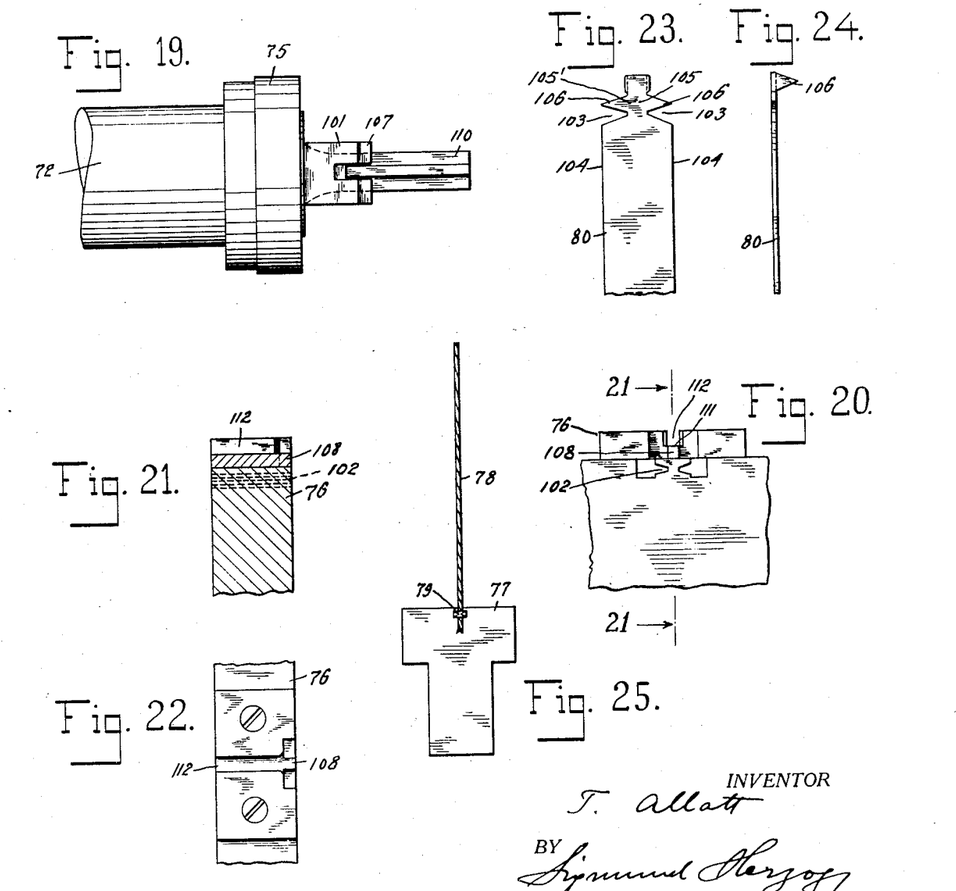
Fig. 19 is a bottom plan view of the dies shown in Figs. 17 and 18.
Fig 20 is a front elevation of the female dies co-operating with the dies shown in Figs. 17 to 19, inclusive.
Fig. 21 is a section taken on line 21—21 of Fig. 20.
Fig 22 is a top plan view of the female dies shown in Figs. 20 and 21.
Fig. 23 is a top plan view of the strip from which the staples are cut, some of the staples being shown in the different stages of forming.
Fig. 24 is a side elevation of the strip shown in Fig. 23.
Fig. 25 is an elevation of a finished tag with a string secured thereto.

In alignment with the punch 66, there is reciprocably mounted in bearings 71 a plunger 72, said plunger moving toward and away from the female punch 65, as will hereinafter appear. To prevent this plunger from turning in its bearings, it has clamped to it two lugs 73, cooperating with a stationary guide 74. To the rear end of this plunger are secured staple punching and forming dies 75, co-operating with female dies 76, mounted in front of the female punch 65. A staple formed by the dies 75 and 76 serves to attach to the tag 77 (Fig. 25) a string 78, the staple being denoted in the said figure by the numeral 79. The staples are formed from a metal strip 80, that is wound upon a reel 81, the latter being rotatably mounted on a bracket 82', that is attached to one of the legs or standards 32 of the frame. From this reel the strip is led upwards to and between feed rollers 82 and 83, (Fig. 4), fixed to shafts 84 and 85, respectively. The shaft 84 is mounted in bearings 86 and the shaft 85 in bearings 87, the latter being spring-pressed, as clearly shown in Fig. 14 of the drawings, thereby causing the feed roller 83 to move toward the roller 82. The roller 83 is provided with a peripheral groove 83' (Fig. 13) to properly guide the metal strip 80. From these rollers the said metal strip is led between vertically disposed guides 88 up to the dies 75 and 76, it being intermittently moved toward the said guides by rotating the feed rollers step by step in opposite directions. For this purpose, there are mounted upon the shafts 84 and 85 gears 89 and 90, respectively, (Fig. 5), said gears being in mesh. To the shaft 84 is furthermore attached a ratchet wheel 91 (Fig. 5), with which co-operates a pawl 92, that is pivoted at 93 to an arm 94, the latter being oscillatably mounted upon the shaft 84. The arm 94 is connected by a rod 95 with a bellcrank lever 96, which is fulcrumed at 96' to the machine frame and carries upon its free end an anti-friction roller 97, on which acts a cam 98, which is fixed to the driving shaft 34. The pin 99, connecting the arm 94 with the rod 95, has attached to it one end of a spring 100, the other end of which is secured to the main frame of the machine. As the main driving shaft rotates, the cam 98, acting on the roller 97, moves the bellcrank lever in the direction of the arrow shown in Fig. 5 of the drawings, thereby causing the pawl 92 to ride over the teeth of the ratchet wheel 91. When then the cam permits the bellcrank lever 96 to move in the opposite direction, the spring 100 shifts the pawl 92 accordingly and gives a partial turn to the ratchet wheel 91, with the result that the metal strip 80 is fed a corresponding distance to the co-acting dies 75 and 76.

The dies 75 and 76 are shown in detail in Figs. 17 to 22, inclusive, of the drawings. The male die 75 includes a punch 101, co-operating with a female punch 102 in the die 76. These punches remove from the strip 80 substantially triangular portions 103, which extend in registering positions from the longitudinal edges 104 of the strip (Fig. 23) transversely toward the center line thereof, the bases of the triangles being disposed at the said longitudinal edges. As the metal strip is fed step by step and these punches remove the said triangular portions, there are formed on the strip transverse bands 105, having prong ends 106, each band being formed into a staple 79 in the following manner: Above the male punch 101 there is mounted upon the die 75 a forming die 107, co-operating with a forming die 108 on the female die 76. These forming dies bend the prongs on the ends of a band 105, formed at the previous operation, at right angles to the plane of the strip 80, as shown in Figs. 23 and 24 of the drawings. The staple so formed is then cut off the strip 80, at the next operation, by a cutter 110 on the die 75, co-operating with a cutting edge 111 on the die 76. In the last-mentioned die is provided a groove 112, in which the staple, with its prongs pointing toward the female punch 65, is forwarded by the cutter 110 to the tag 77, as the latter is being punched by the die 66, in co-operation with the die 65, from the strip 36.

The plunger 72 is provided at its forward end with a pin 113, engaging a slot 114 in an oscillatable frame 115, the latter being fulcrumed at 116 to the machine frame and operatively connected by a rod 117 with a crank pin 118 on the cam 98.

The mechanisms actuating the tag punching die 66 and the staple forming dies 75 are so timed that they are caused to move toward each other and act upon the paper strip 36 and metal strip 80 when these two strips are at rest. The strip feeding devices, on the other hand, are so timed in relation to the mechanisms which actuate the punching dies that both strips are fed forward when the punching dies move away from one another.

Figure 1:
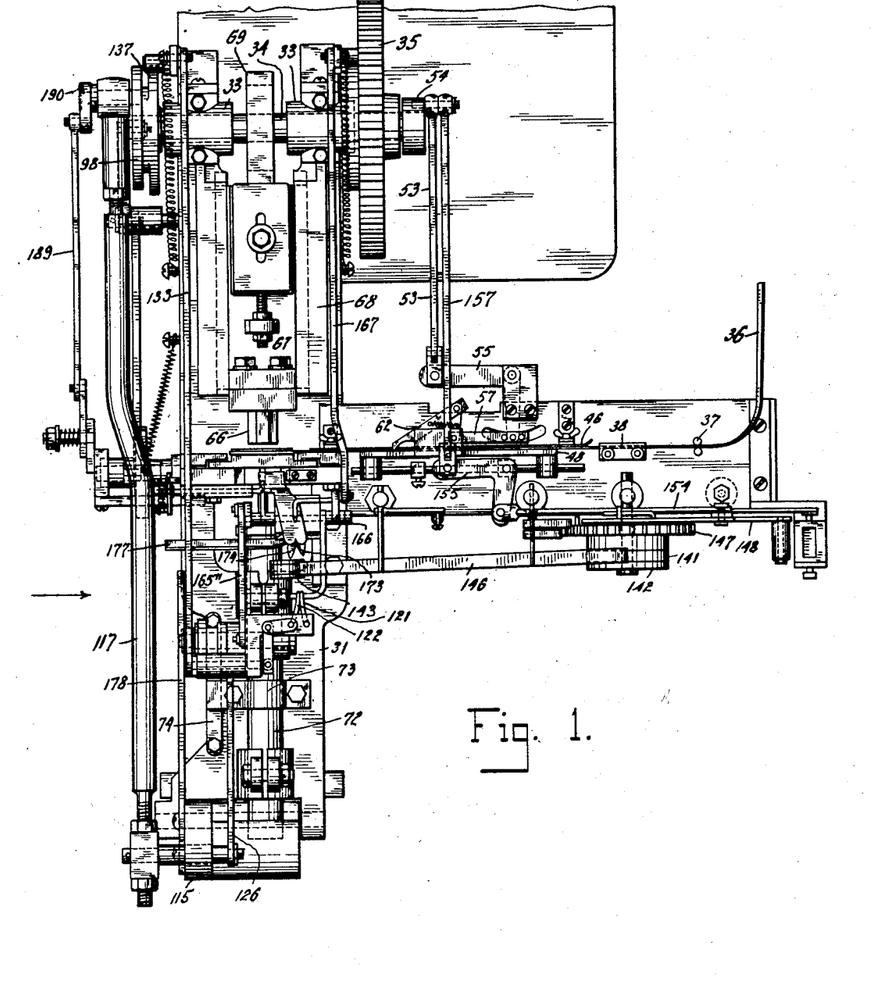
Figure 1 is a top plan view of a tag machine constructed in accordance with the present invention.
Figure 2:
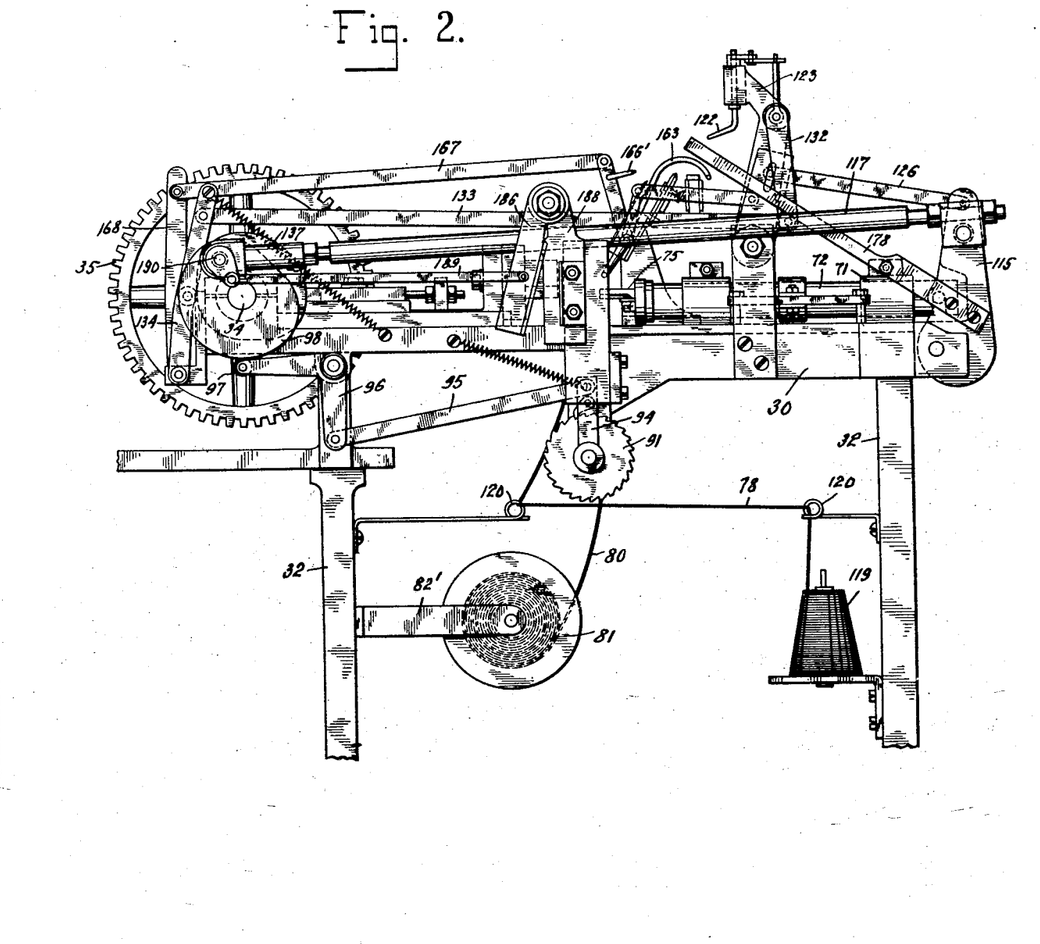
Fig. 2 is a side elevation thereof, looking in the direction of the arrow shown in Fig. 1 of the drawings.
Figure 3:
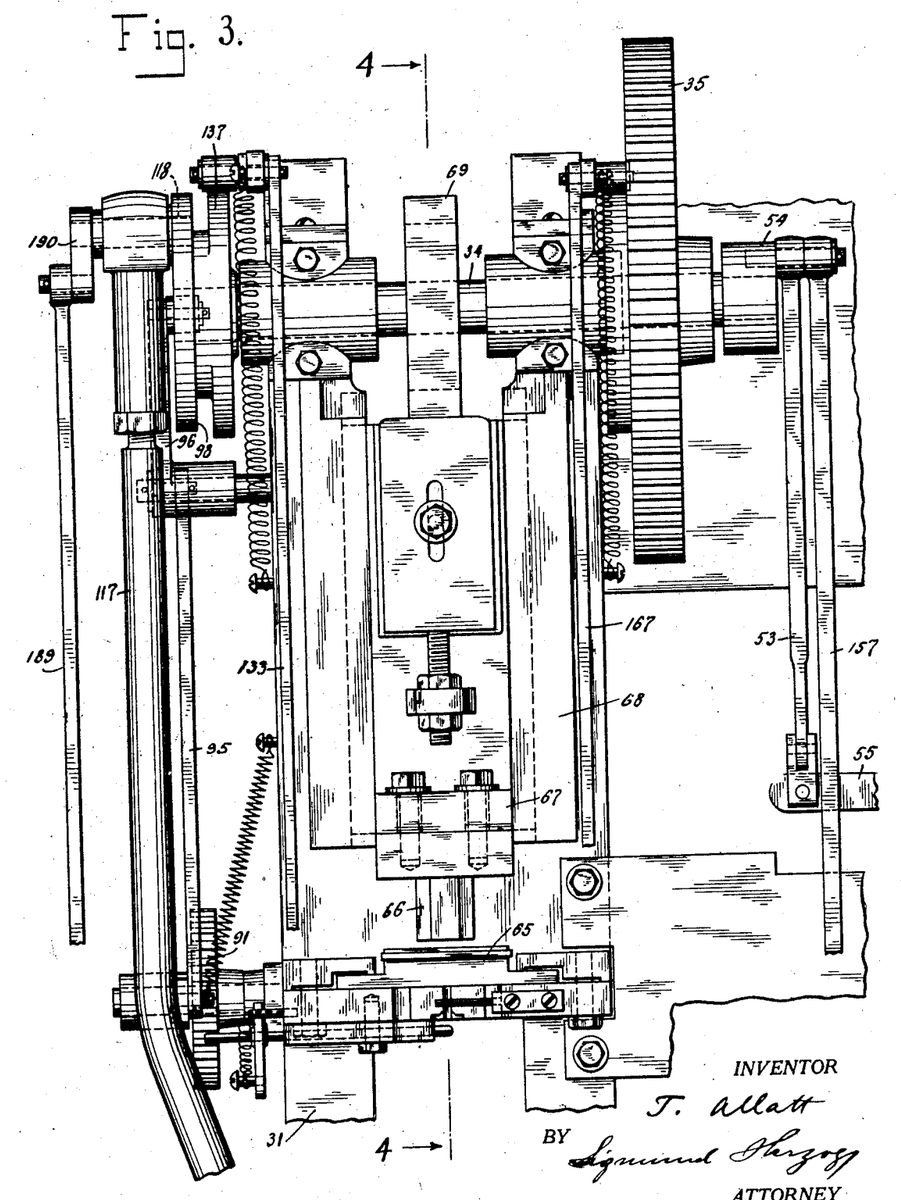
Fig. 3 is a top elevation of the rear portion of the machine, on a larger scale.
Figure 4:
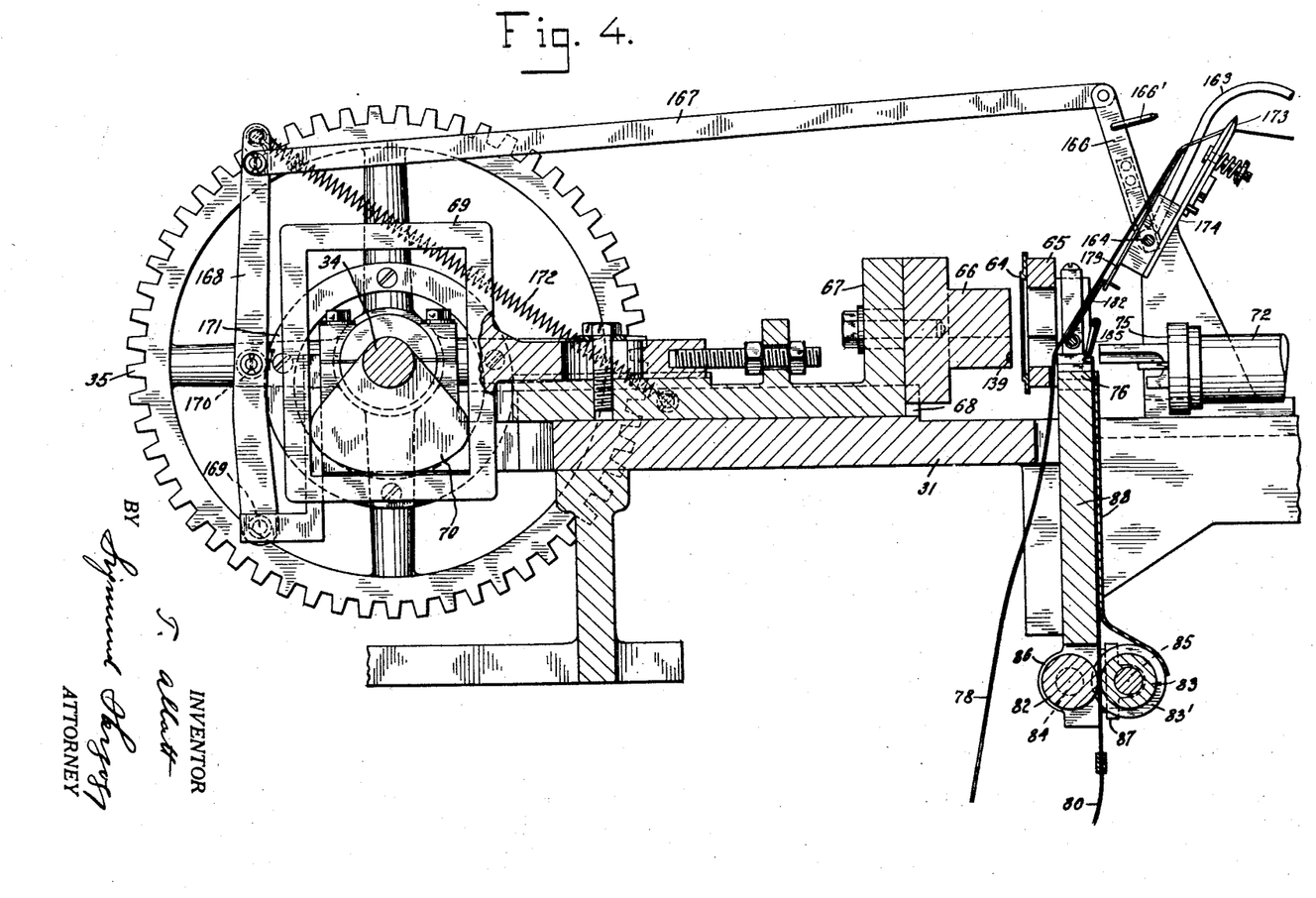
Fig. 4 is a section taken on line 4—4 of Fig 3.
Figure 15:
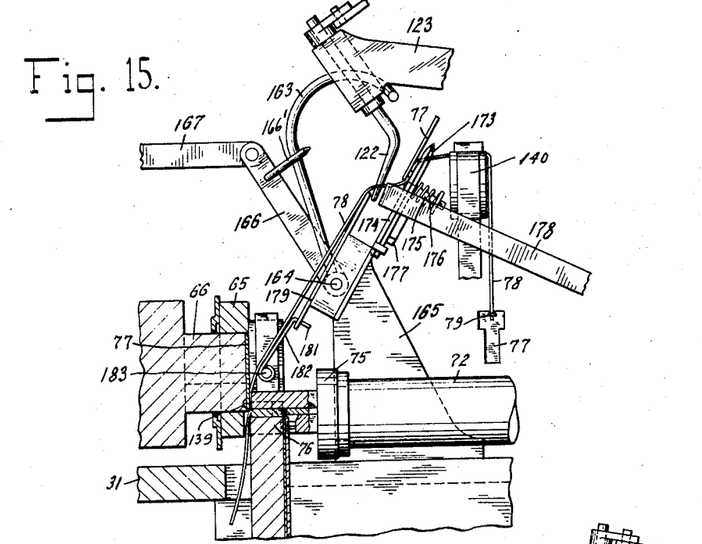
Fig. 15 is a section, partly in elevation, of the punching and staple forming dies and the mechanism for cutting and feeding the strings.

The string 78 to be attached to the tags 77 is led from a spool 119 through guides 120 upwards between the female punch 65 and the female dies 76, as shown in Fig. 4 of the drawings, it being fed intermittently past the said two dies by a pair of co-operating fingers 121 and 122. These fingers are mounted upon a swinging frame 123, which is fixed to a horizontally extending spindle 124, journaled in the machine frame and having attached to it a lever 125, connected by a link 126 with the frame 115. The finger 121 is rigidly attached to the frame 123, while the spindle 127 of the finger 122 is oscillatably mounted in the said frame, the finger 122 being thus adapted to move to and from the finger 121. The spindle 127 is provided with a crank arm 128, connected by a link 129 with an arm 130, the latter being attached to a spindle 131 which extends horizontally through the frame 123 and is oscillatably mounted therein. To the spindle 131 is fixed a link 132, connected by a bar 133 with a lever 134, that is fulcrumed at 135 to the machine frame and carries an anti-friction roller 136, co-operating with a cam 137 on the driving shaft 34. A spring 138, engaging the lever 134 and the machine frame, serves to hold the anti-friction roller 136 in continuous contact with the cam 137. When the frame 123 is in its inner position, shown in Fig. 15 of the drawings, the finger 122 is swung toward the finger 121, gripping the string 78 and carrying it with it as the said frame swings outwards into the position shown in Fig. 16 of the drawings, thus feeding the proper length of string in relation to the tag punched from the tag strip by the dies described.

The string is fed past the groove 112 in the staple forming die 76. When, therefore, a staple is forwarded by the cutter 110 in the said groove toward the tag, the said staple engages with its web portion 105' the string, the prongs or pointed ends of the staple penetrating the tag and entering a recess 139 in the punch 66, thereby the said prongs are deflected and bent against that face of the tag which is opposite to the one against which the web portion of the staple abuts. In this manner the string it attached to the tag.

The fingers 121 and 122 carry the tag and a string thereon on their outward stroke over a conveyer 140, shown in detail in Fig.

9 of the drawings. This conveyer comprises an endless belt 141, running over a roller 142 and over a cylindrical stationary block 143. The block 143 is carried by a bracket 144, while the roller 142 is rotatably journaled in a bearing 145. Above the upper portion of the belt is held a plate member 146, forming a guide as will hereinafter appear. To the spindle of the roller 142 is fixed a ratchet wheel 147, with which co-operates a pawl 148, that is fulcrumed at 149 to a lever 150, the latter turning around a pivot pin 151 on the machine frame. One end of this pawl carries a pin 152, which is held in engagement with the teeth of the ratchet wheel by a counterweight 153 on the other end of the said pawl. The lever 150 is connected by a link 154 with a bellcrank lever 155, fulcrumed at 156 to the machine frame and connected by a rod 157 with the crank 54 above referred to. A portion of the ratchet wheel is toothless, as indicated at 158, and diametrically opposite to the said toothless portion the ratchet wheel carries a pin 159, for co-operation with the hook-shaped member 160, that is fulcrumed at 161 to the lever 150. The belt 141 is given by the pawl 148 intermittent movement, the ratchet wheel being moved tooth by tooth, until the hook-shaped member 160 engages the pin 159, when it is moved through an angular distance corresponding to several teeth, for a purpose hereinafter to be described. To prevent the ratchet wheel 147 from turning in the opposite direction, there are two dogs 162 provided.

Figure 16:
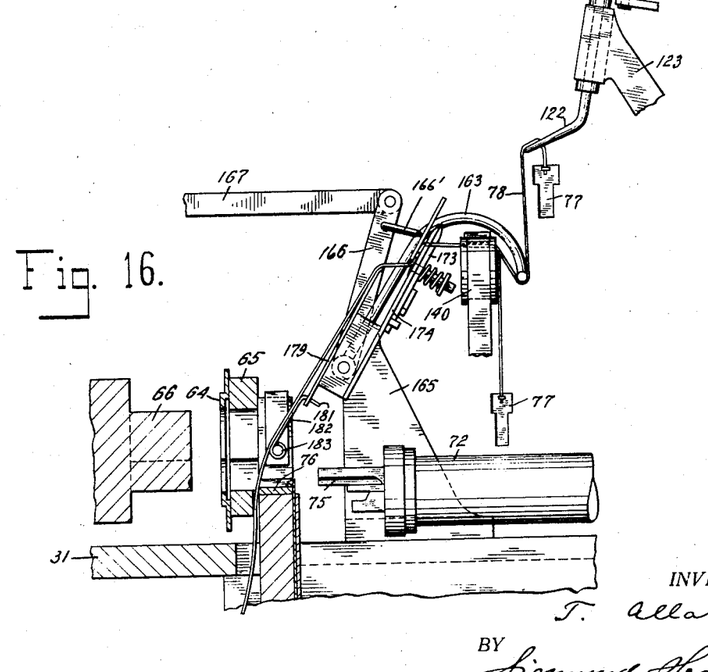
Fig. 16 is a similar elevation, showing the elements in other positions.
Figure 17:
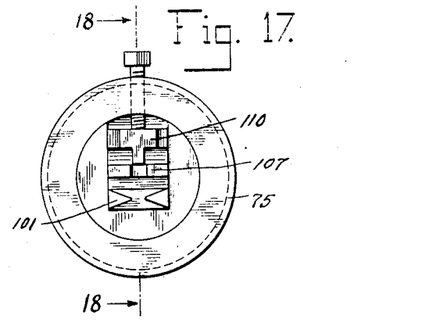
Fig. 17 is a rear elevation of the staple forming dies.
Figure 18:
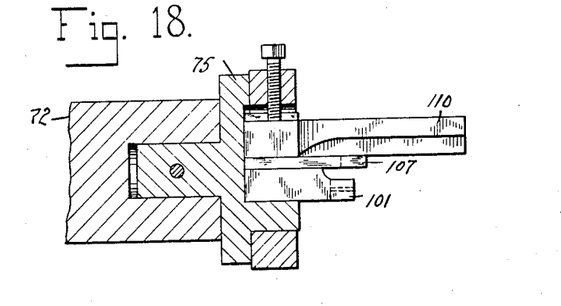
Fig. 18 is a section taken on line 18—18 of Fig. 17.

When the fingers 121 and 122 move outwards into the positions shown in Fig. 16 of the drawings, the string is brought to bear against the belt 141 by an oscillatable presser-foot 163. This presser-foot is fixed to a spindle 164, journaled in a standard 165, and having fixed to it a lever 165', the latter being connected by a link 165'' with the frame 123. When the fingers 121 and 122 are in the positions shown in Fig. 16 of the drawings, the presser-foot 163 is swung outwards, thereby pressing the string on the tag against the belt 141 and keeping it there until the string is disposed between the said belt and the guide plate 146. The fingers release then the string and are swung back into the position shown in Fig. 15 of the drawings, again gripping the string below the next tag in the series.

The string is drawn between the blades 173 and 174 of a cutting mechanism. The blade 174 is fixedly attached to the standard 165, while the blade 173 moves around a spindle 175 on the blade 174. On the spindle 175 is wound a spring 176, fixed to the said spindle and to the movable blade, its tendency being to keep the blades in their open positions. To the movable blade 173 is attached an arm 177, with which co-operates an arm 178, that is fixed to the swinging frame 115. The movement of this swinging frame is so timed that, when the fingers 121 and 122 move into the position shown in Fig. 15 of the drawings and have gripped the tag string, the arm 178 moves against the arm 177 and swings the movable blade 173 toward the blade 174, cutting the string above the tag which then rests in rear of the blades 173 and 174, (see Fig. 15).

As mentioned above, the ratchet wheel moves tooth by tooth, but near the end of each revolution it is shifted through an arc corresponding to a number of teeth. By reason of this construction, the strings and the tags thereon which are carried by the conveyer are separated from the next bunch, each bunch containing as many tags as there are teeth in the ratchet wheel. The operator removes these bunches, and ties them together in any suitable manner.

Figure 5:
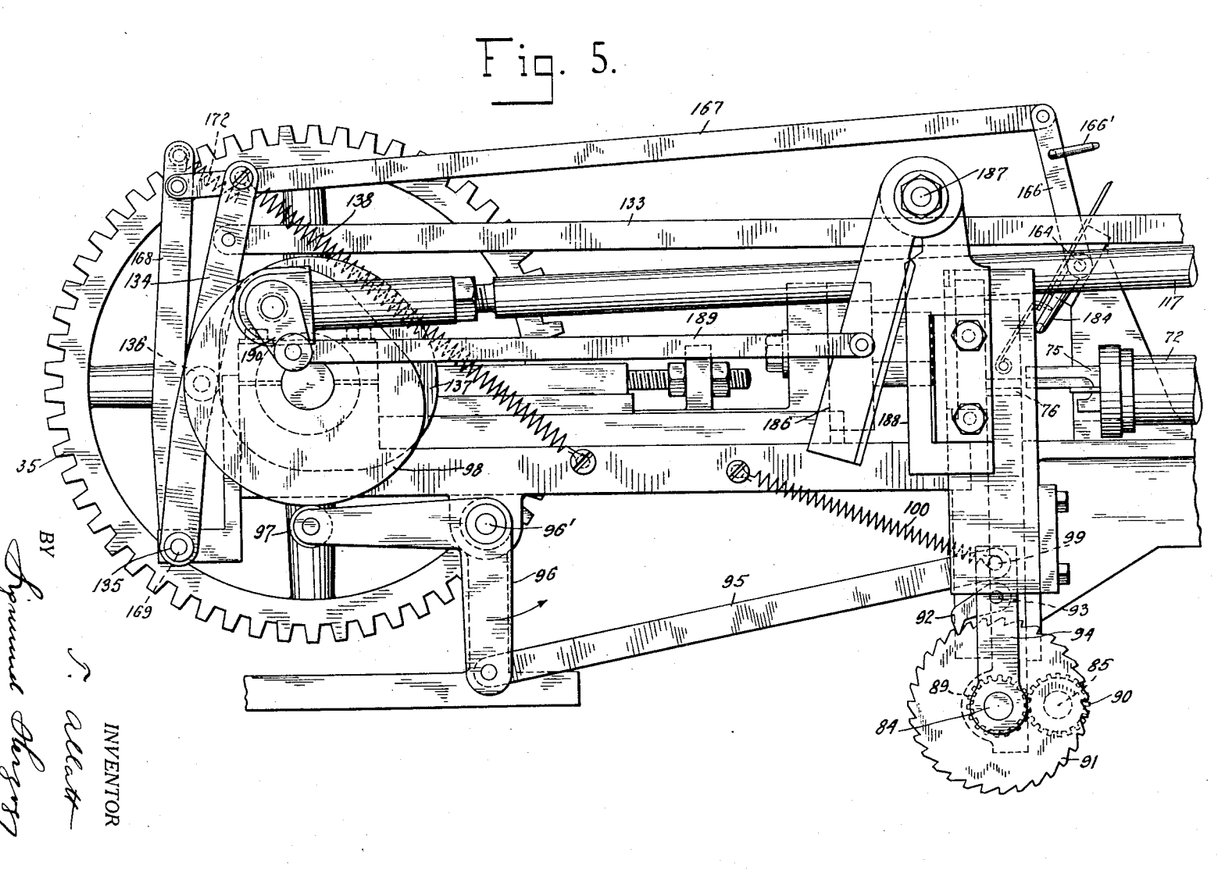
Fig. 5 is a side elevation of the detail shown in Fig. 4.
Figure 6:
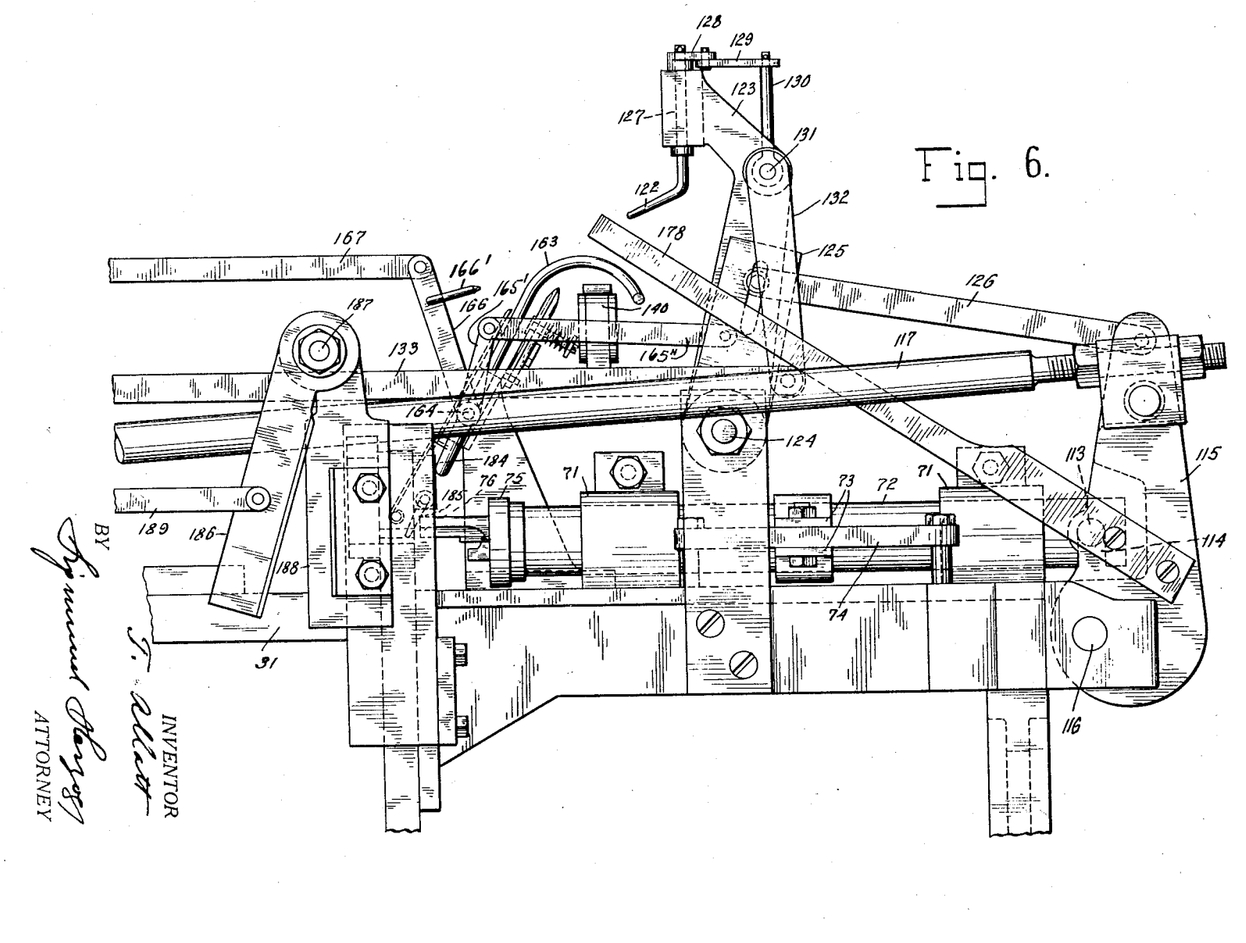
Fig. 6 is a side elevation of the front portion of the machine, on a larger scale.
Figure 7:
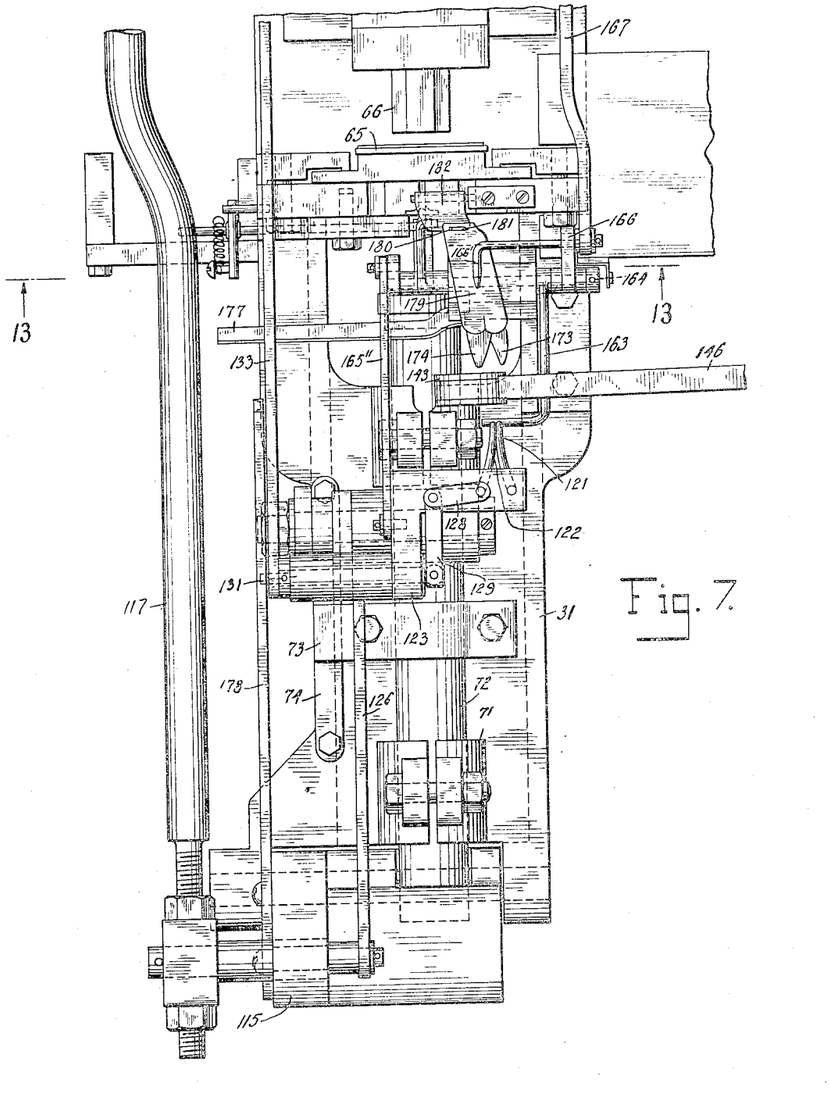
Fig. 7 is a top elevation of the detail shown in Fig. 6.

In order to properly guide the tag string, there is attached to the standard 165 a plate member 179, having an aperture 180, through which extends a lug 181 on a plate member 182, the latter being pivoted at 183 to the machine frame. With the pivoted plate member co-operates a lug 184, that is fixed to the spindle 164, (Figs. 5 and 6). When the gripping fingers 121 and 122 move outwards into the position shown in Fig. 16 of the drawings and the presser-foot 163 moves accordingly, the lug 184 bears against the plate member 182, causing the same to swing around its pivot 183 toward the die 76, thus putting tension on the string and placing it in position so that the gripping fingers may properly grip the same at their next inward movement.

When a staple enters the groove 112 in the female die 76, it is prevented from rising therein by a pivoted lug 185 (Figs. 4 and 6). As the cutter 110 forwards this staple, it lifts the pivoted lug 185, more particularly when the staple is already in engagement with the tag.

A cutter 186 (Fig. 5) is provided for severing the scrap from the tag strip, the scrap falling into a receptacle, not shown. The cutter 186 is pivoted at 187 to a stationary cutting blade 188 upon the machine frame. The movable cutter is connected by a rod 189 with a crank 190, carried by the cam 98.

An electrical device may be mounted upon the machine to indicate the fact when a string 78 is forwarded to the conveyer 140 without a tag 77 thereon. For this purpose, for instance, a finger 166' is mounted upon an arm 166, which is loosely mounted upon the spindle 164. This lever is connected by a rod 167 with a lever 168, which is fulcrumed at 169 to the machine frame. The lever 168 carries intermediate its ends an antifriction roller 170, with which cooperates a cam 171, attached to the gear 35. A spring 172, fixed to the lever 168 and to the machine frame, serves to hold the roller 170 in continuous contact with its cam. The finger 166' is in alignment with the cutter blade 174. The finger 166' and the blade 174 are in an electric circuit (not shown), containing a bell or other signal. When the string 78 moves above the blade 174 without a tag, the finger 166' contacts, on its outward movement, with the blade 174, sounding the alarm. When a tag is resting on the blade 174 (Fig. 16), the circuit is not closed, the tag being made of insulating material.

The operation of the machine is as follows: When the punch 66 and the staple forming die 75 move toward one another, a tag is punched from the paper strip and the staple formed during the previous operation is severed from the metal strip and forwarded in the groove 112 in the die 76 to the tag, fastening, in a manner above described, the string to the latter. The fingers 121 and 122 grip then the string and, in moving into the position shown in Fig. 16 of the drawings, it is brought into engagement with the conveyer 140, the presser-foot 163 aiding in this latter operation. The dies 66 and 75 move in the meantime away from one another. While this takes place, the paper and metal strips are fed forward for the next punching operation, the tag string being fed forward by the fingers 121 and 122 as they move toward their outer positions. The dies abovementioned move then again toward one another, and the fingers 121 and 122 to gripping positions. After these fingers have gripped the string, the cutting mechanisms 173 and 174 sever the string, so that the latter, with the tag attached thereto, may be carried away by the conveyer. As above pointed out, the mechanisms are all timed so that the several parts work harmoniously.

What I claim is:—

1. In a tag machine, the combination with a mechanism for intermittently feeding a strip, of a punching device for cutting tags from said strip, metal strip feeding means, co-acting dies in alignment with said punching device for forming staples from said metal strip, string feeding means feeding a string between said punching device and said staple forming dies, a mechanism carried by said staple forming means for severing the staples from said metal strip and driving the same through the tags so as to attach the string thereto, and means for severing the string adjacent its point of attachment to a tag.

2. In a tag machine, the combination with a strip feeding means, of a punching device for cutting tags from said strip, a metal strip feeding means, co-acting dies for forming staples from said metal strip, string feeding means for feeding a string in operative relation to said punching device, a mechanism carried by said staple forming means for severing the staples from said metal strip and driving the same through the tags so as to attach the string thereto, and means for severing the string adjacent its point of attachment to the tag.

3. A tag machine according to claim 1, comprising an intermittently moving conveyer, said string feeding means drawing the string above said conveyer, and means for engaging the string with the conveyer.

4. A tag machine according to claim 2, comprising an intermittently moving conveyer, said string feeding means drawing the string above said conveyer, and means for engaging the string with the conveyer.

Signed at New York, in the county of New York, and State of New York, this 28th day of September, A. D. 1922.

THOMAS ALLATT.